United States Patent
Dechu et al.

(10) Patent No.: US 10,762,564 B2
(45) Date of Patent: Sep. 1, 2020

(54) AUTONOMOUS PEER-TO-PEER ENERGY NETWORKS OPERATING ON A BLOCKCHAIN

(71) Applicant: International Business Machines Corporation, Armonk, NY (US)

(72) Inventors: Sampath Dechu, Bangalore (IN); Ramachandra Kota, Bangalore (IN); Pratyush Kumar, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 15/348,810

(22) Filed: Nov. 10, 2016

(65) Prior Publication Data
US 2018/0130130 A1    May 10, 2018

(51) Int. Cl.
*G06Q 40/04* (2012.01)
*G06Q 50/06* (2012.01)

(52) U.S. Cl.
CPC .......... *G06Q 40/04* (2013.01); *G06Q 50/06* (2013.01)

(58) Field of Classification Search
CPC .................................................. G06Q 40/00
USPC .......................................................... 705/38
See application file for complete search history.

(56) References Cited

U.S. PATENT DOCUMENTS

| | | | | |
|---|---|---|---|---|
| 5,687,968 A * | 11/1997 | Tarantino | ............... | A63F 3/081 273/139 |
| 6,098,051 A * | 8/2000 | Lupien | ............... | G06Q 40/00 705/36 R |
| 6,272,474 B1 * | 8/2001 | Garcia | ............... | G06Q 40/00 705/35 |
| 6,278,982 B1 * | 8/2001 | Korhammer | ........... | G06Q 40/04 705/36 R |
| 6,356,911 B1 * | 3/2002 | Shibuya | ............ | G01C 21/3446 |
| 6,721,715 B2 * | 4/2004 | Nemzow | .............. | G06Q 20/105 705/35 |
| 7,062,361 B1 * | 6/2006 | Lane | ...................... | F25D 29/00 700/291 |
| 7,130,789 B2 * | 10/2006 | Glodjo | .................. | G06Q 20/10 705/37 |
| 7,315,840 B1 * | 1/2008 | Keith | ..................... | G06Q 40/00 705/35 |

(Continued)

FOREIGN PATENT DOCUMENTS

| | | |
|---|---|---|
| EP | 2725455 A1 | 4/2014 |
| GB | 2531828 A | 5/2016 |

OTHER PUBLICATIONS

K. Vijayakumar, "Multiobjective Optimization Methods for Congestion Management in Deregulated Power Systems", Journal of Electrical and Computer Engineering, vol. 2012 (2012), Article ID 962402, 8 pages http://dx.doi.org/10.1155/2012/962402.

(Continued)

*Primary Examiner* — Kirsten S Apple

(57) ABSTRACT

A blockchain configuration may be used to store a distributed ledger for an energy optimization procedure. One example method of operation may include measuring energy metrics associated with network devices operating on a network via meter devices, identifying potential changes to existing energy usage of the network based on the energy metrics, logging the energy metrics and the potential changes as part of a distributed ledger, and storing the distributed ledger in a blockchain block.

18 Claims, 10 Drawing Sheets

(56) References Cited

U.S. PATENT DOCUMENTS

| | | | | |
|---|---|---|---|---|
| 7,392,213 B2* | 6/2008 | Merkoulovitch | G06Q 40/06 | 705/36 R |
| 7,831,494 B2* | 11/2010 | Sloan | G06Q 40/00 | 705/35 |
| 8,073,763 B1* | 12/2011 | Merrin | G06Q 40/04 | 705/35 |
| 8,126,794 B2* | 2/2012 | Lange | G06Q 30/08 | 705/36 R |
| 8,359,260 B2* | 1/2013 | Merrin | G06Q 40/04 | 705/35 |
| 8,417,618 B2* | 4/2013 | Milne | G06Q 40/04 | 705/37 |
| 8,755,943 B2* | 6/2014 | Wenzel | G05F 1/66 | 700/276 |
| 9,052,731 B2 | 6/2015 | Smit | | |
| 2002/0147671 A1* | 10/2002 | Sloan | G06Q 40/00 | 705/36 R |
| 2002/0147675 A1* | 10/2002 | Das | G06Q 30/08 | 705/37 |
| 2002/0194099 A1* | 12/2002 | Weiss | G06Q 40/06 | 705/36 R |
| 2003/0182224 A1* | 9/2003 | Horrigan | G06Q 40/00 | 705/37 |
| 2004/0024692 A1* | 2/2004 | Turbeville | G06Q 40/025 | 705/38 |
| 2005/0080703 A1* | 4/2005 | Chiesa | G06Q 40/00 | 705/36 R |
| 2005/0124408 A1* | 6/2005 | Vlazny | G06Q 20/363 | 463/28 |
| 2008/0015871 A1* | 1/2008 | Eder | G06Q 10/067 | 706/21 |
| 2009/0106140 A1* | 4/2009 | De La Motte | G06Q 20/10 | 705/37 |
| 2009/0307149 A1* | 12/2009 | Markov | G06Q 40/00 | 705/36 R |
| 2010/0088210 A1* | 4/2010 | Gardner | G06Q 40/00 | 705/35 |
| 2011/0119166 A1* | 5/2011 | Steinberg | G06Q 10/06 | 705/34 |
| 2012/0239453 A1* | 9/2012 | Osogami | G06Q 10/04 | 705/7.25 |
| 2012/0323753 A1* | 12/2012 | Norman | G06Q 40/00 | 705/37 |
| 2013/0275334 A1* | 10/2013 | Andersen | G06Q 40/06 | 705/36 R |
| 2014/0201110 A1* | 7/2014 | Sato | G01R 21/133 | 705/412 |
| 2014/0281645 A1 | 9/2014 | Sen et al. | | |
| 2015/0058261 A1* | 2/2015 | Parikh | H04L 67/1002 | 705/412 |
| 2015/0134440 A1 | 5/2015 | Vespasiani | | |
| 2015/0229516 A1 | 8/2015 | Thanos et al. | | |
| 2015/0310461 A1* | 10/2015 | Lee | G06Q 30/0202 | 705/412 |
| 2015/0363866 A1* | 12/2015 | Depew | G06Q 30/0633 | 705/26.8 |
| 2016/0042342 A1 | 2/2016 | Proctor, Jr. et al. | | |
| 2016/0056628 A1 | 2/2016 | Burstall et al. | | |
| 2016/0117784 A1* | 4/2016 | Hwang | G06Q 50/06 | 705/412 |
| 2016/0196521 A1* | 7/2016 | Wada | G06Q 50/06 | 705/7.25 |
| 2018/0074523 A1* | 3/2018 | Cantrell | G05D 1/104 | |

OTHER PUBLICATIONS

Qin Sun; Aaron Beach; Michael E. Cotterell; Zhengkai Wu; Santiago Grijalva, "An Economic Model for Distributed Energy Prosumers", System Sciences (HICSS), 2013 46th Hawaii International Conference on Year: 2013, pp. 2103-2112, DOI: 10.1109/HICSS.2013.81.

Lazaros Gkatzikis; George Losifidis; Lordanis Koutsopoulos; Leandros Tassiulas, "An Collaborative placement and sharing of storage resources in the Smart Grid", Smart Grid Communications (SmartGridComm), 2014 IEEE International Conference on Year: 2014, pp. 103-108, DOI: 10.1109/SmartGridComm.2014.7007630.

"Mechanism to collect and anonymize smart grid consumption data and protect consumer privacy while retaining meaning for grid infrastructure providers", Disclosed Anonymously, IPCOM000242823D; Aug. 21, 2015.

A.J. Dinusha Rathnayaka; Vidyasagar M. Potdar; Samitha J. Kuruppu, "An innovative approach to manage prosumers in Smart Grid", Sustainable Technologies (WCST), 2011 World Congress on Year: 2011, pp. 141-146.

* cited by examiner

US 10,762,564 B2

AUTONOMOUS PEER-TO-PEER ENERGY NETWORKS OPERATING ON A BLOCKCHAIN

TECHNICAL FIELD

This application relates to identifying energy characteristics of nodes on a network and more particularly to autonomously identifying optimal energy sources via a blockchain.

BACKGROUND

In a blockchain configuration, information that is logged with blockchain transactions is available for auditing purposes to third parties. In addition to financial information, what is needed is an ability to efficiently use the blockchain to store information pertaining to products and services related to the transaction.

SUMMARY

One example embodiment may include a method that comprises at least one of measuring energy metrics associated with network devices operating on a network via meter devices, identifying one or more potential changes to existing energy usage of the network based on the energy metrics, logging the energy metrics and the one or more potential changes in a distributed ledger, and storing the distributed ledger in a blockchain block.

A further example embodiment may include a system that comprises at least one of one or more meter devices configured to measure energy metrics associated with network devices operating on a network, wherein the network devices identify one or more potential changes to existing energy usage of the network based on the energy metrics, wherein the energy metrics and the one or more potential changes are logged in a distributed ledger and wherein the distributed ledger is stored in a blockchain block.

Another example embodiment may include a non-transitory computer readable medium comprising instructions that, when executed by a processor, cause the processor to perform at least one of measuring energy metrics associated with network devices operating on a network via one or more meter devices, identifying one or more potential changes to existing energy usage of the network based on the energy metrics, logging the energy metrics and the one or more potential changes in a distributed ledger and storing the distributed ledger in a blockchain block.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide an application and/or software procedure which identifies current network energy utilization on a blockchain and determines an optimal energy resource allocation based on one or more of known network configuration, attributes, energy usage, network capacity, etc. As network devices operate on a network, the amount of energy utilized can be measured and logged by a meter device in communication with the network devices. The blockchain can be used to securely store such transactions and offer secure, well-established and reliable data to interested parties. Energy usage is one of many types of data that can be retrieved and processed from a reliable blockchain information source. A 'beast' (blockchain-enabled autonomous smart meter technology) device may be implemented as a network of devices, interconnected over communication networks and integrated into the energy consuming and generating devices.

Figure 1A:
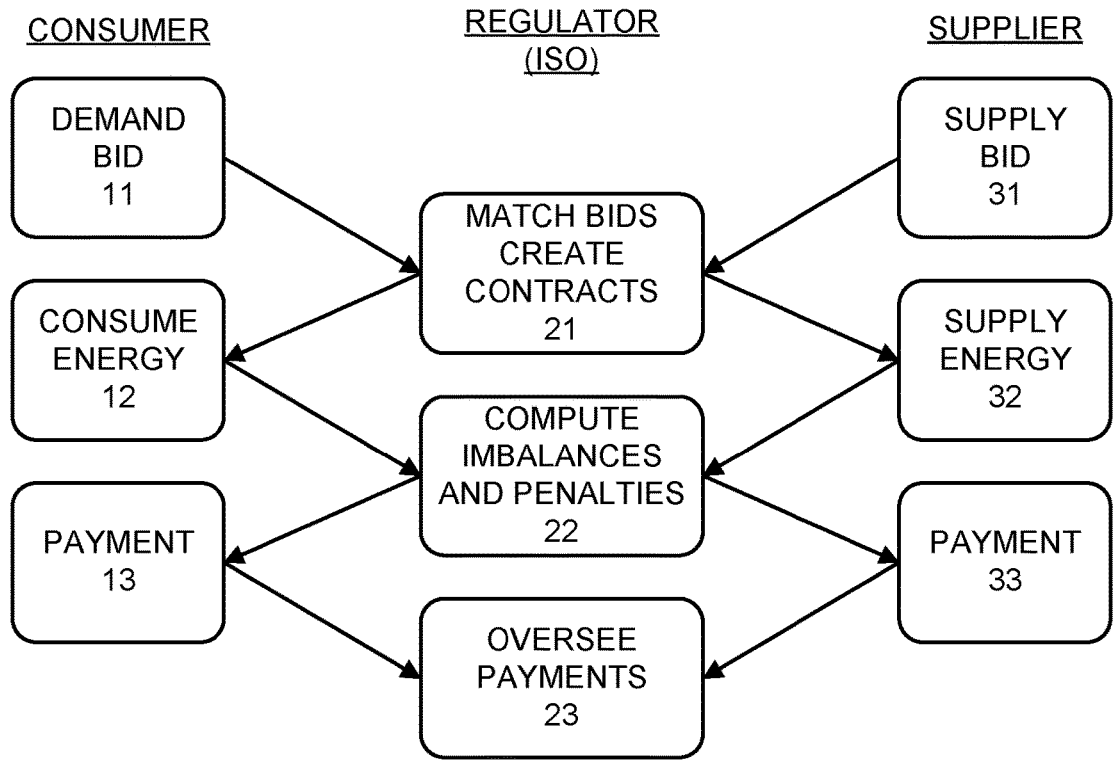
FIG. 1A illustrates a logic diagram of a conventional energy market configuration.

FIG. 1A illustrates a conventional approach 10 to managing energy consumption/distribution in centralized energy markets. Referring to FIG. 1A, the centralized energy markets include a consumer, regulator and supplier. The consumer is responsible for a demand bid 11, consuming energy 12 and providing payment 13. The regulator may match bids to create contracts 21 based on supplier information, such as supply bids 31. The supply energy 32 and payment 33 may also be used to compute any imbalances and penalties 22 and oversee payments 23.

Example embodiments propose a system, device, non-transitory computer readable medium and method for autonomous peer-to-peer energy networks which enable a set of consumers or prosumers (individuals who purchase equipment with features suitable for professional use or who are involved in the design, manufacture, or development of a product or service) to setup and operate a decentralized market for trading energy. The system may include a network of blockchain-enabled autonomous smart meter technology (beast), hereinafter 'beast' devices interconnected over electrical and communication networks, interfacing with energy consuming and generating devices. The beast devices use blockchain technology to perform one or more of place bids, create contracts, log energy measurements, compute imbalances and settlements and validate payments. This provides a decentralized tamper-resistant mechanism to substitute centralized regulatory authorities as are necessary in today's energy markets. The beast devices access a distributed ledger to provide energy-specific analytic operations to optimize trading strategies.

Figure 1B:
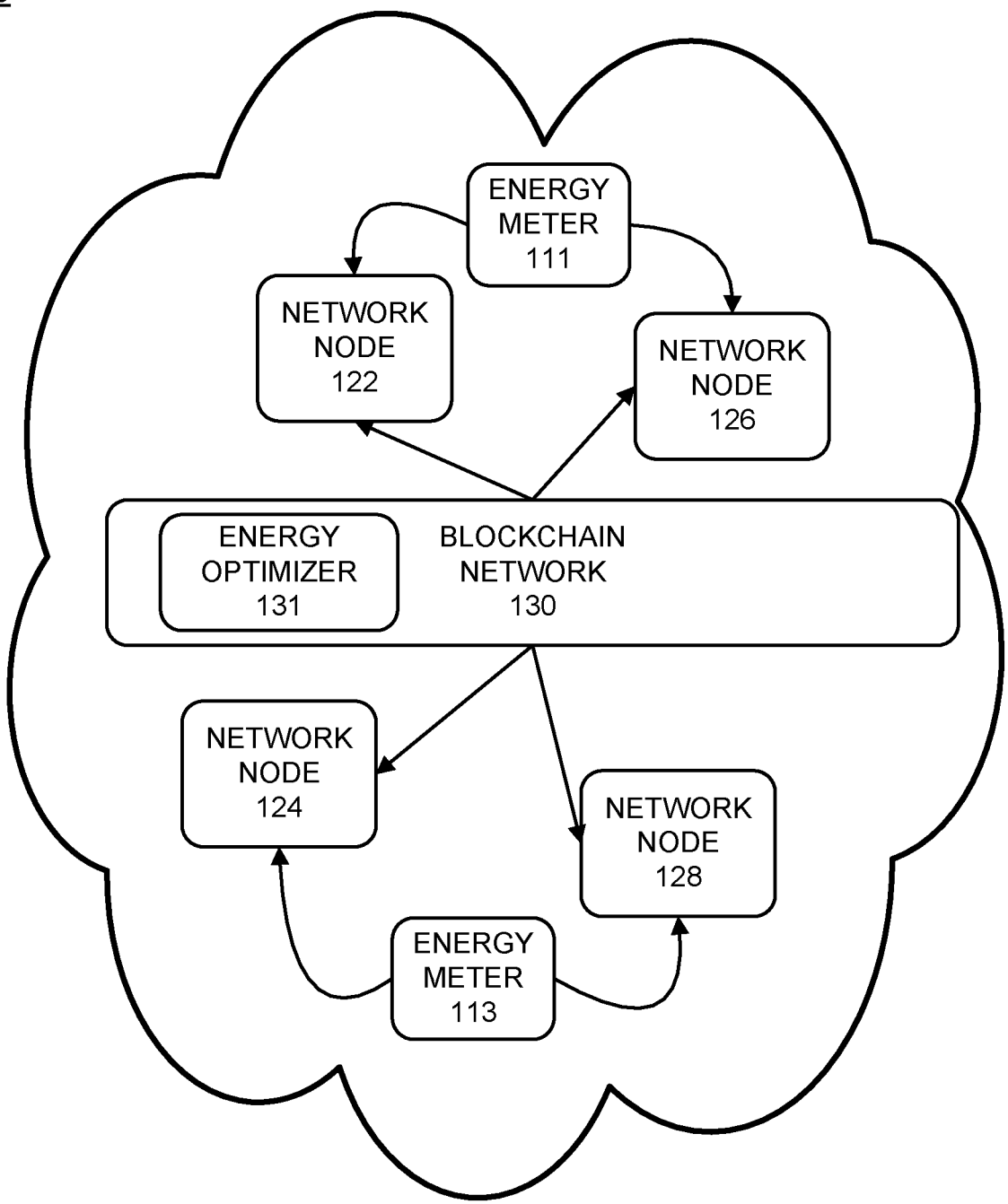
FIG. 1B illustrates a network diagram of a blockchain network configuration with energy measuring meter devices according to example embodiments.

FIG. 1B illustrates a network configuration 100 represented as a network cloud, which could be an enterprise network, the Internet, a private network, etc. The network includes a series of network nodes 122, 124, 126 and 128, which may be many different types of computing devices operating on the network and communicating over the network. The network may be an autonomous peer-to-peer energy monitoring network, which employs energy meter devices 111 and 113 as devices which perform one or more of monitor energy usage of nodes on the network, communication between nodes on the network, an amount of data access to servers, etc. The number of network nodes and metering devices may vary depending on the size of the network. A blockchain network configuration 130 may be used to store the transactions being conducted and processed by the network. The blockchain transactions may include audit network performance metrics, energy usage data, network usage data, etc.

The meters 111 and 113 may be agent modules stored in the nodes or may be separate smart meters which are relatively easy to install and setup for collecting energy usage metrics. The devices 111 and 113 can be interconnected over energy and/or communication networks, interfacing with energy using devices, such as nodes or energy specific devices. The network devices may use blockchain information storage and retrieval functions to perform one or more of identify energy requirements, create bids, create contracts, log information, etc. The meter devices and other network devices may identify energy measurements occurring on a network, compute energy imbalances, determine settlements, and validate payments, which can be utilized for subsequent energy usage given the calculations performed by the nodes. In operation, the network devices access a distributed ledger, which is stored in the blockchain, to provide energy-specific analytic operations to assist with energy trading strategies. The meters can be used to provide decentralized energy forecasting based on assumptions regarding the supply and consumption of energy on the network. Each meter device may log information about a predetermined number of network nodes (e.g., 1 meter per 10 nodes). The logs are stored in the distributed ledger and the data can be analyzed by accessing the ledger data in the blockchain. Reputation scores can be calculated by a designated energy optimizer 131, such as a pre-programmed software module, a designated device or any designated network resource capable of calculating such scores, energy needs and/or requirements. Both the bids and actual transacted energy are logged in the contract and energy-measurement blocks of the blockchain and any device operating on the network can calculate the reputation scores for any other network device.

According to one example method of operation, an autonomous peer-to-peer energy network may enable a set of entities to setup and operate a decentralized market for trading energy by placing bids, establishing contracts, metering energy transfers, and settling payments. According to one example, a network of beast devices, are implemented to utilize the blockchain for decentralized verifiable transactions. Such devices may enable updating of energy credits based on an external financial system and create blockchain transactions, generate bids for energy demand/supply of certain entities along with pricing and contractual terms and create blockchain transactions as open bids which satisfy contractual terms to finalize peer-to-peer contracts and create blockchain transactions. The devices may measure bi-directional energy flow from/to certain entities and create blockchain transactions as energy flow analysis logs based on the network to compute balance payments. Additionally, blockchain transactions can be created to transfer energy credits, validate any open blockchain transactions and append them to the distributed ledger. This approach may provide recommendations on forecasted demand and supply, suggested prices in bids, and estimated reputation of other entities by analyzing the distributed ledger for certain entities for a period of time or for certain devices and their energy requirements.

The beast devices may include one or more of electrical sensors, a processor, a memory, a display and networking modules and the functional features may include the capability to measure power/energy, create blocks in a distributed ledger, validate open blocks using cryptography, compute bids, imbalances and penalties and analyze the distributed ledger to provide bidding support. The interfaces may enable interfacing with user devices to gather requirements and preferences, interfacing with external financial system to maintain energy credits for settling payments, interfacing with consumption entities (i.e., smart homes, generators, solar panels) to forecast and match supply and demand, and interfacing with other beast devices for blockchain transactions.

Figure 1C:
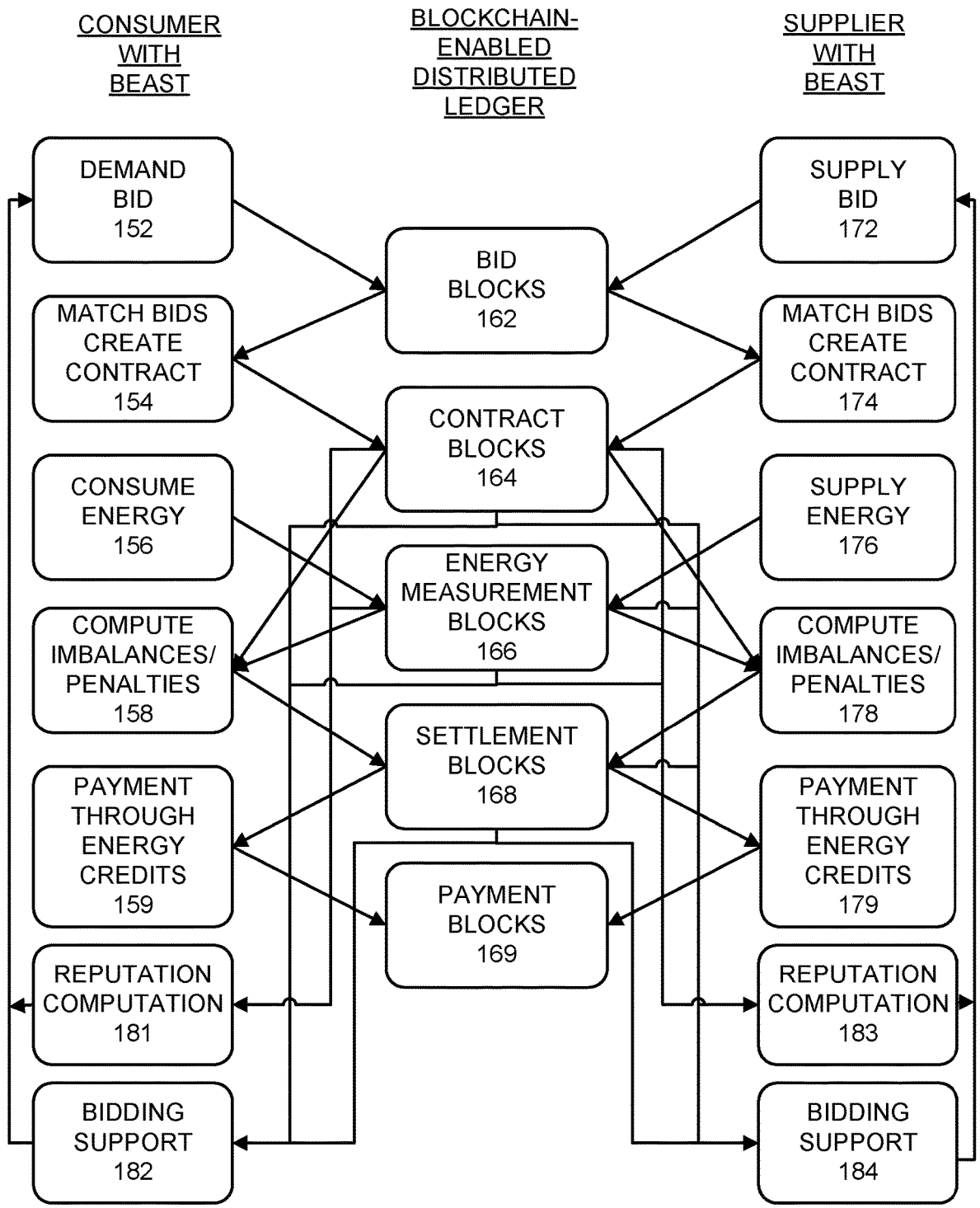
FIG. 1C illustrates a logic diagram of a blockchain energy market configuration with beast device functionality.

FIG. 1C illustrates the beast enhanced functionality offered to the consumer and supplier for energy bids according to example embodiments. Referring to FIG. 1C, the example 150 include a consumer using beast devices, a supplier with beast devices and a blockchain-enabled ledger used to manage the consumer and supplier interactions. A demand bid 152 and supply bid 172 may be received and stored in a bid block 162. The contract blocks 164 can then be used to match bids 154 and create a contract 174 and store the relevant information. The energy supply 176 and consumption 156 can be measured as part of an ongoing process 166 to identify any imbalances or penalties 158 and 178. The settlement blocks 168 may identify the payments required by both parties and notify the supplier and consumer to provide payment 159 and 179. The payment blocks 169 may be used to track the payment information. Forensic information may be used to update a reputation score 181 and 183 for either parties and such information can be updated in user profiles stored in the blockchain and used for subsequent bidding support examples 182 and 184.

Figure 2:
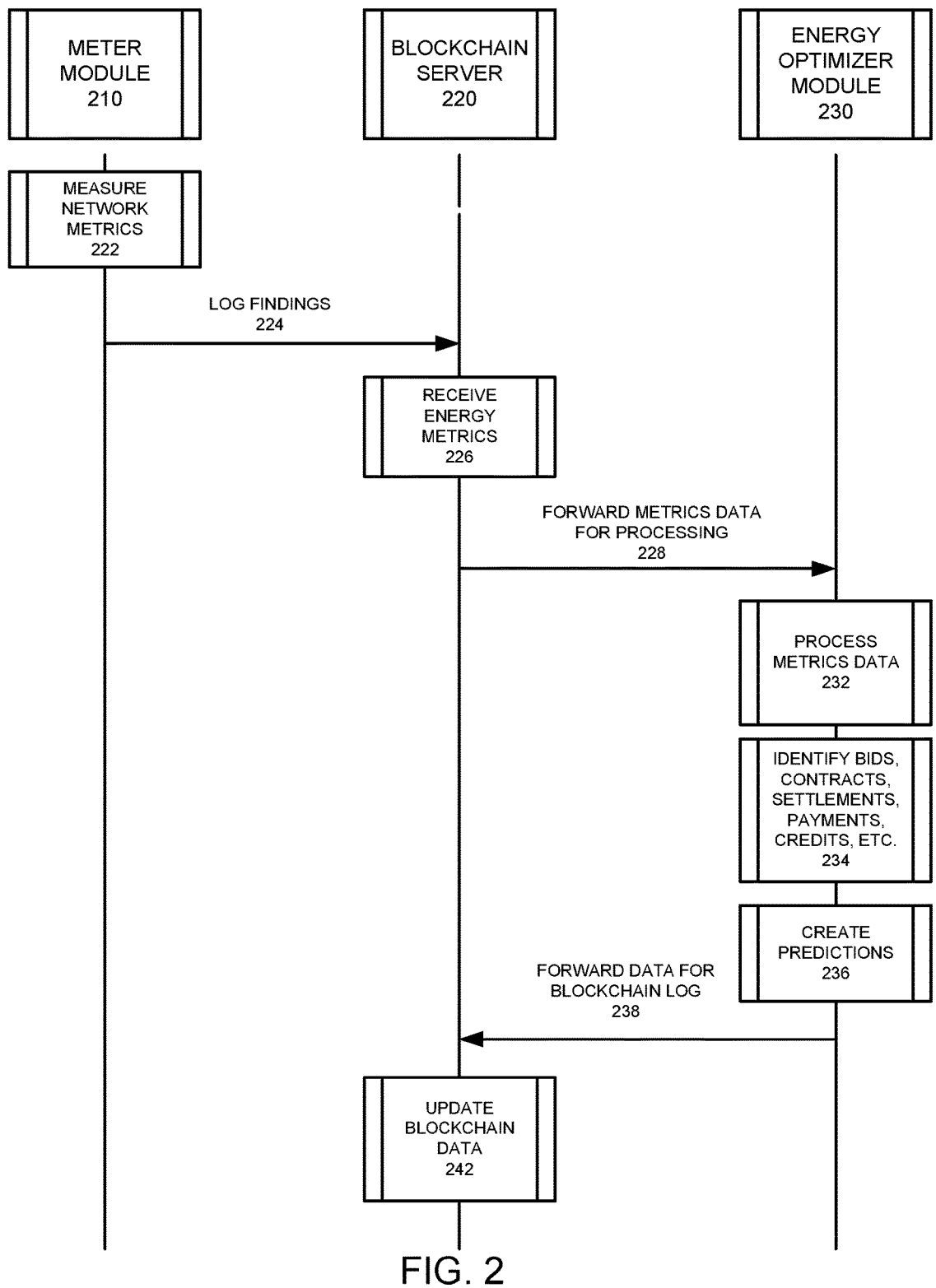
FIG. 2 illustrates a system signaling diagram of a blockchain energy optimization configuration according to example embodiments.

FIG. 2 illustrates an example system diagram of signaling and communication among entities on a network according to an example embodiment. Referring to FIG. 2, the system 200 may include a blockchain server 220 which may be any device capable of storing a blockchain and/or logging transactions in the blockchain. The configuration includes a meter module 210 which may be any one of meter units, devices, agents, etc., that identifies energy usage and energy requirements 222 of nodes on a network. The findings may be logged and stored 224 in the blockchain server 220. The metrics may include a series of energy usage information for particular devices over a period of time or other metrics. The metrics are logged 226 and forwarded 228 to an energy optimizer module 230 so predictions, forecasts and other operations can be performed to ensure that the next energy change is optimal for the requirements of the network devices. The metrics data is processed 232 by the optimizer module 230 and bids, contracts, settlements, payments, credits, etc., can all be accessed, updated, etc. 234, in order to justify an ongoing energy schedule and/or a new energy contract which may be more optimal than a previous contract. Any changes which are determined to be optimal are created 236 and the information is logged in the blockchain 238 as a new blockchain transaction 242. In one embodiment, the optimizer module 230 is stored on a separate device or one or more of the meter module 210 or the blockchain server 220.

Figure 3:
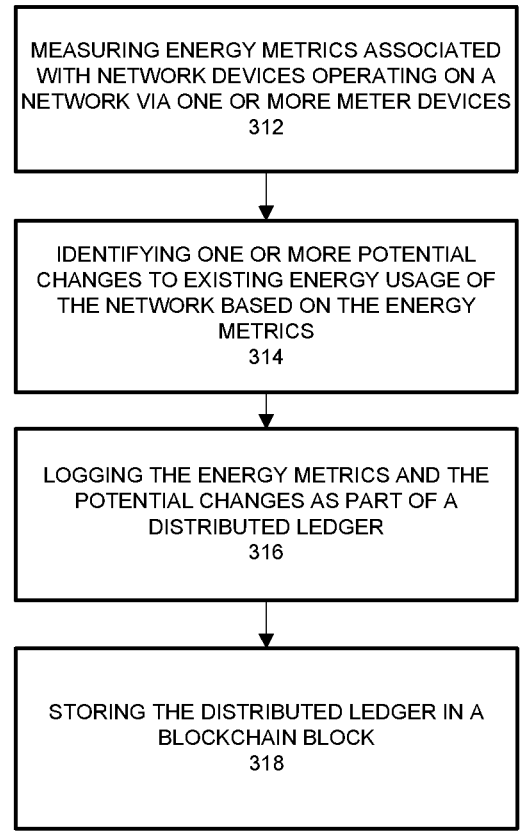
FIG. 3 illustrates a flow diagram of an example method of operation according to example embodiments.

FIG. 3 illustrates an example flow diagram according to example embodiments. Referring to FIG. 3, the flow diagram 300 includes one or more of measuring energy metrics associated with network devices operating on a network via one or more of meter devices 312, identifying one or more potential changes to existing energy usage of the network based on the energy metrics 314, logging the energy metrics and the one or more potential changes as part of a distributed ledger 316, and storing the distributed ledger in a blockchain block 318. The energy metrics may include one or more of energy consumption, energy bids, energy contracts, energy payment, and energy payment validation. The energy metrics may include a log of the energy metrics as part of the distributed ledger which includes one or more of creating an energy analytic forecast including one or more of energy bids, energy use and energy reputation scores of the network devices. The method may also include placing a bid for energy as one or more of the potential changes based on the energy metrics, receiving a contract based on the bid for energy, and updating the distributed ledger in the blockchain block to include the contract. The method may also include measuring bidirectional energy usage on the network via one or more of the plurality of meter devices, storing the bidirectional energy usage in the distributed ledger, and processing the directional energy usage to create one or more of balance payments and energy credits as the one or more potential changes. The method may also include calculating a supply and demand of energy from the energy metrics, and creating a suggested bid price based on the calculated supply and demand of energy. The blockchain block can be stored in one or more of the network devices, the plurality of meter devices, or other devices communicably coupled to the network devices or meter devices.

Autonomous peer-to-peer energy networks may be used to enable a set of consumers and/or prosumers to setup and operate a decentralized market for trading energy. The system may include a network of beast devices interconnected over electrical and communication networks, interfacing with energy consuming and generating devices. Each beast device may be able to perform one or more of placing bids, generating bids for energy demand/supply of consumers and/or prosumers, pricing and contractual terms, creating bid blocks in a distributed ledger, matching bids, creating contracts by matching open bids satisfying contractual terms, finalizing peer-to-peer contracts, creating contract blocks in a distributed ledger, measuring energy, measuring bi-directional energy flow from/to consumers and/or prosumers, creating energy measurement blocks in a distributed ledger, computing imbalances and penalties, using energy measurement blocks to compute balance payments, creating settlement blocks in the distributed ledger, providing payments through energy credits including updates to energy credits, interfacing with an external financial system, creating payment blocks in the distributed ledger, computing reputations of consumers and/or prosumers, analyzing historical contract and measurement blocks in the distributed ledger, bidding support by recommending price and quantity of energy to bid based on forecasted demand/supply (for example, by using historical contracts), measurement and settlement blocks in the distributed ledger.

Figure 4:
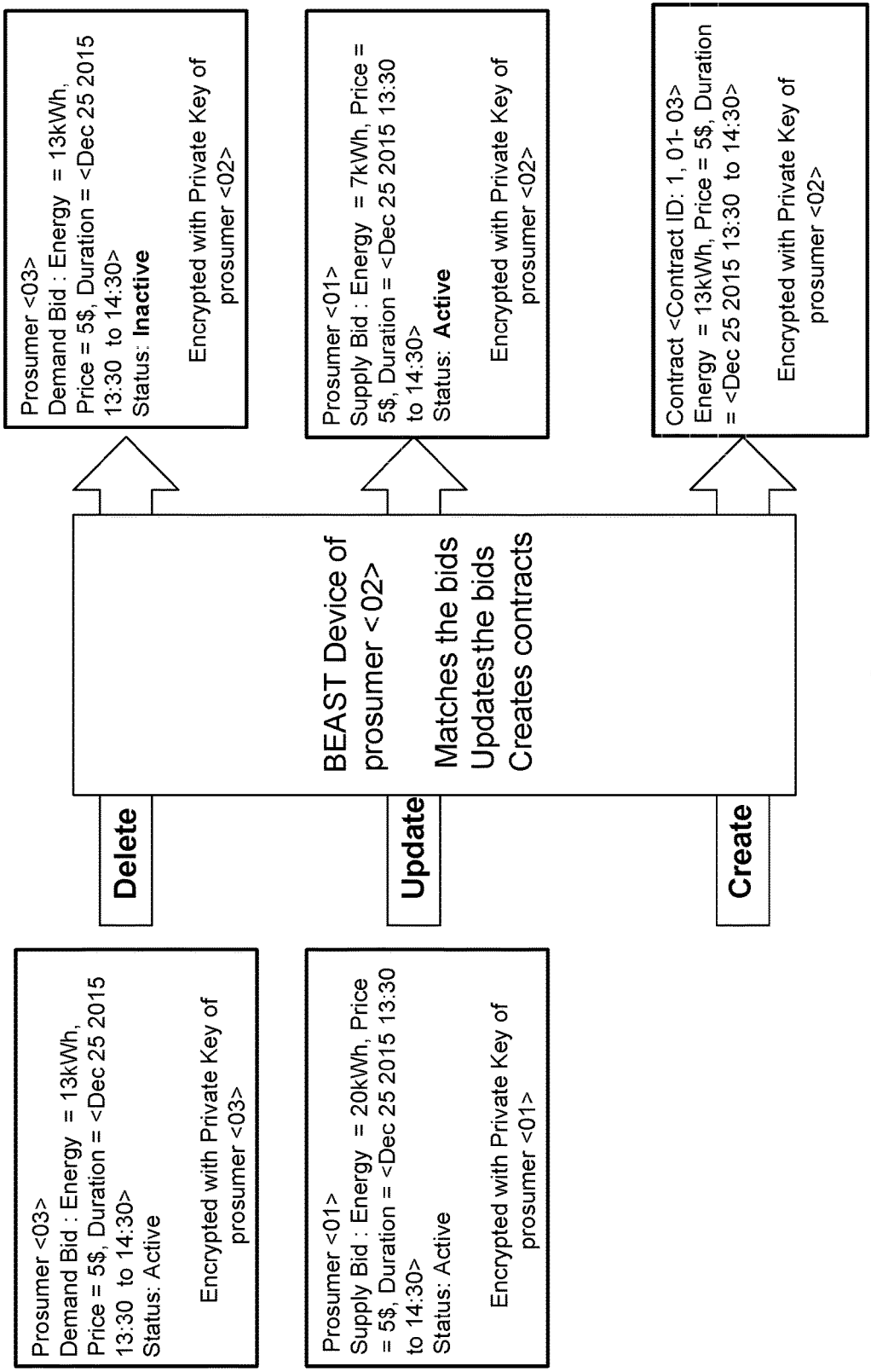
FIG. 4 illustrates a process of using matching bids and creating contracts with a beast device according to example embodiments.

FIG. 4 illustrates a process of using matching bids and creating contracts with a beast device according to example embodiments. Referring to FIG. 4, the process 400 includes consumer and/or prosumer devices <03> and <01> attempting to reach a bid agreement. The beast device <02> is configured to match bids, update bids in the blockchain and create contracts in the blockchain. The result is an original bid for energy is inactivated and the bid is updated to include a change to the energy requirements to include 13 kWh in the contract based on original demands and supply bids. All inputs and outputs can be encrypted for security purposes.

Figure 5:
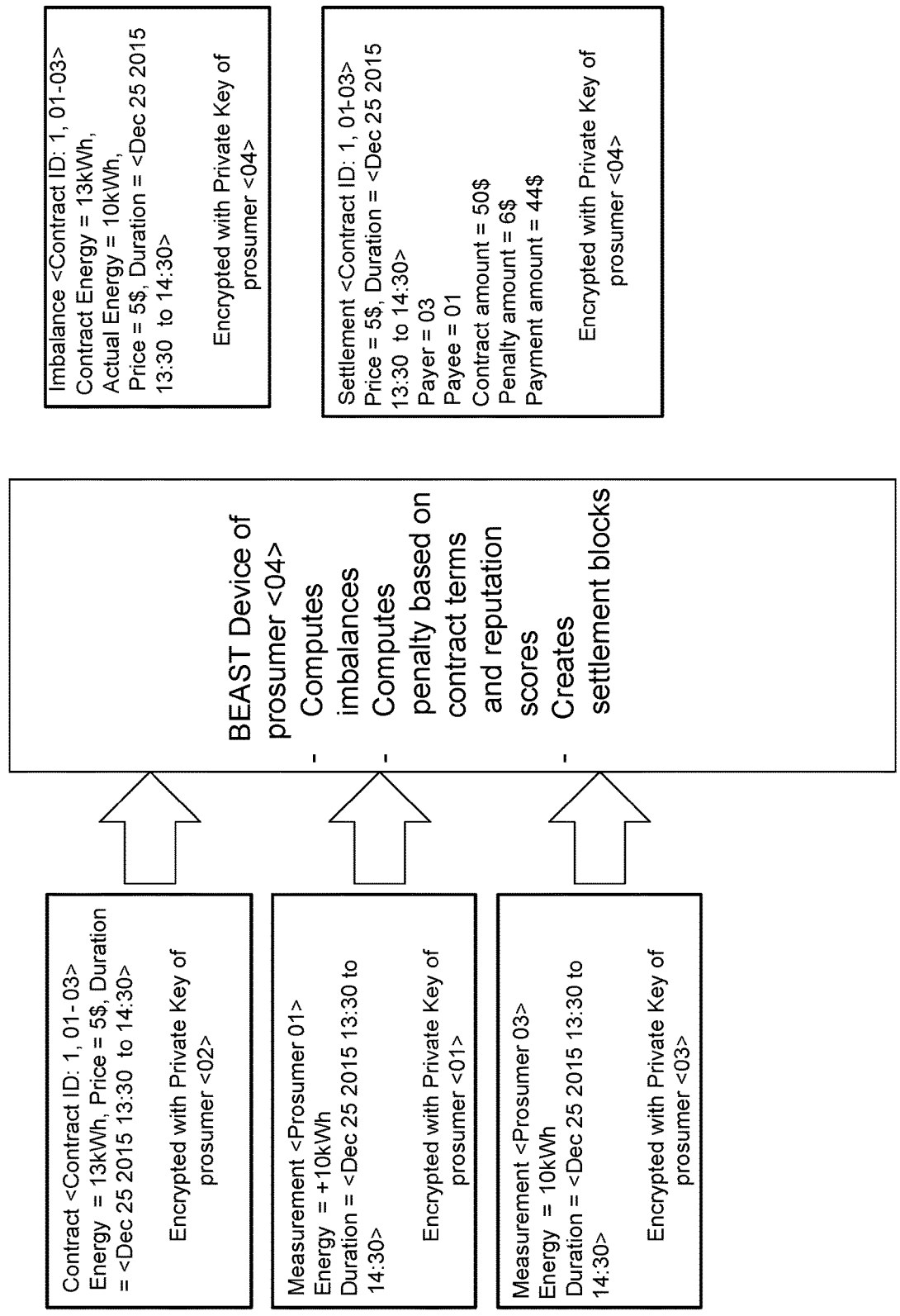
FIG. 5 illustrates a process of using identifying imbalances and penalties with a beast device according to example embodiments.

FIG. 5 illustrates a process of using identifying imbalances and penalties with a beast device according to example embodiments. Referring to FIG. 5, the example 500 includes a beast device <04> configured to receive contract information, compute imbalances, penalties and using reputation and contract information to finalize a settlement term(s). The settlement term is organized similar to a contract and, along with the rest of the information, is stored in the blockchain.

Prosumers may deviate from their contractual terms when an action occurs, for example, a supplier producing less than a contracted amount. This information is logged in the blocks of the distributed ledger which are accessed by the beast device(s) to compute a reputation score for each consumer and/or prosumer. For instance, a reputation score 'R' for consumer and/or prosumer 01 at time T can be represented by the following R(T,01)=LogisticFunction:

$$\left(\frac{1}{T}\sum_{t=0}^{T}\left|1-\frac{b(t)}{a(t)}\right|e^{(t-T)}\right),$$

where b(t) is the amount of energy bid by prosumer 01 at time t and a(t) is the amount of energy supplied by prosumer 01 at time t.

Consumers and/or prosumers typically forecast their energy supply/demand based on historical patterns of consumption (e.g., HVAC load based on temperature), production (e.g., solar output based on irradiance), etc. This information is logged in the blocks of the distributed ledger which is accessed by the beast device(s). Based on the forecasted supply/demand and the historical prices (e.g., based on past contracts) the beast device provides suggestions on the bid parameters. In a smart energy context, the use of blockchain produces results including the provision for decentralized forecasting. As both the supply and consumption logs are in the distributed ledger, the data can be analyzed and/or calculated by a user and/or device to forecast both demand and supply. This also applies to prices which are logged in the form of bid logs. Also, as both the bids and actual transacted energy are logged in the contract and energy-measurement blocks, the reputation scores can be analyzed and/or calculated by a user and/or device. Further, if all parties agree to a specific reputation metric(s), related results can be tied with a penalty settlement which can be distributed.

The network of beast devices can interface with an external financial system with trusted communication links, (not shown) and consumer/prosumers can deposit and withdraw money or other financial instruments at the financial system which can then be translated to appropriate credits and debits of energy tokens. The financial system can have limited interface to the blockchain ledger maintained by the network of beast devices to specifically update the energy tokens credited or debited to the consumers/prosumers. This is performed by inserting a special blockchain transaction which is encrypted with the private key assigned to the financial system with a message format which modifies a distributed state variable that maintains the balance of all consumers/prosumers. The blockchain transactions can be validated by the beast devices and appended to the distributed ledger. The beast devices can measure the total amount of energy flowing both to and from a prosumer at regular intervals of time as decided by the prosumers (e.g., once every 15 minutes). This measurement is ensured to be tamper-proof by storing the measured values in the protected memory region of the beast device which cannot be accessed by any other application. The beast device creates a blockchain transaction for each of the measured values with a message format which then modifies the distributed state of measured values for each of the consumers/prosumers. The blockchain transactions are validated by the beast devices and appended to the distributed ledger.

Figure 6:
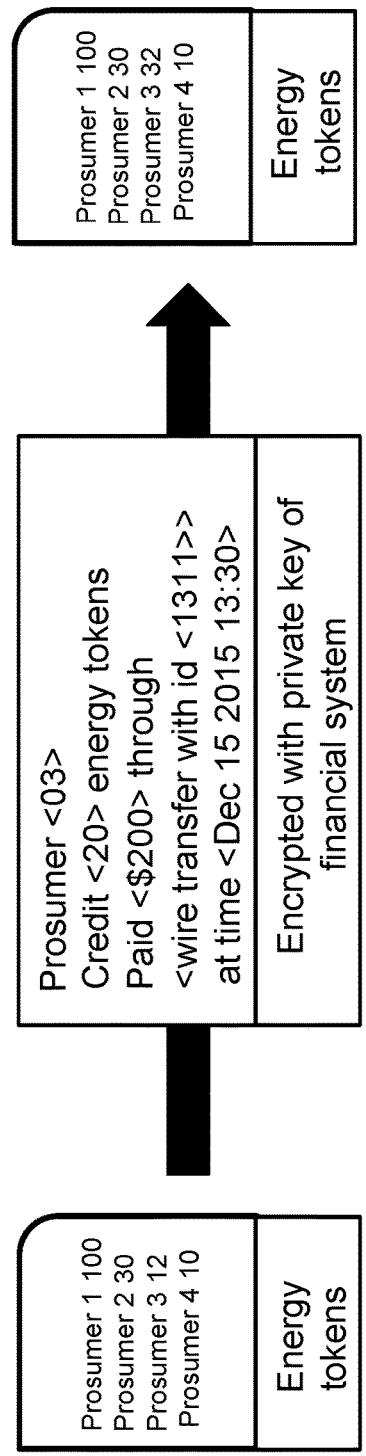
FIG. 6 illustrates a process of updating energy credits with a beast device according to example embodiments.

FIG. 6 illustrates a process of updating energy credits with a beast device according to example embodiments. Referring to FIG. 6, the example 600 includes energy tokens being identified from a record of consumer/prosumer data. The information is then credited with the payment system to modify payment requirements and update the ledger.

Figure 7:
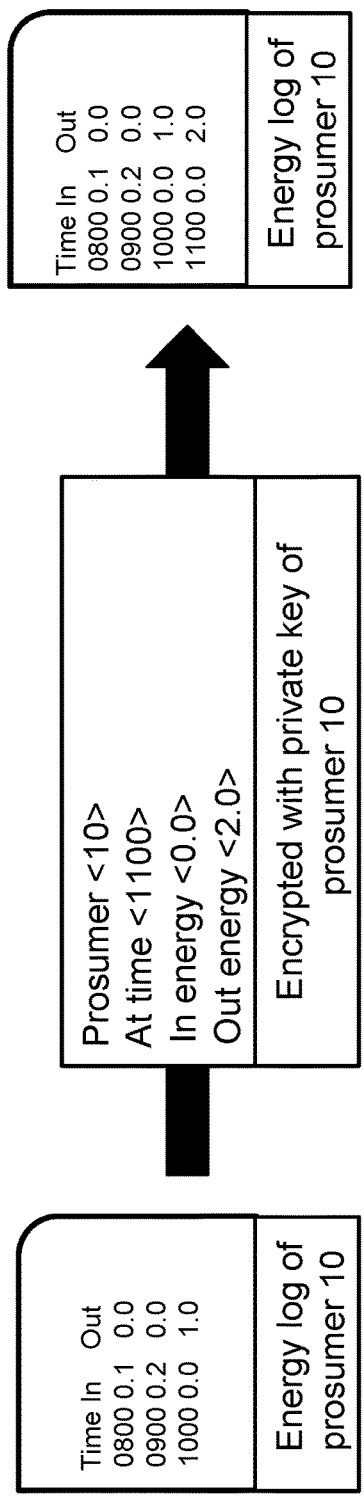
FIG. 7 illustrates a process of measuring bi-directional energy flow to and from prosumers and creating blockchain transactions according to example embodiments.

FIG. 7 illustrates a process of measuring bi-directional energy flow to and from prosumers and creating blockchain transactions according to example embodiments. Referring to FIG. 7, the example 700 includes an energy log for a particular prosumer. The results indicate any changes in energy use since the last log attempt. All transactions may be stored and updated in the blockchain.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent or be integrated in any of the above-described components, etc.

Figure 8:
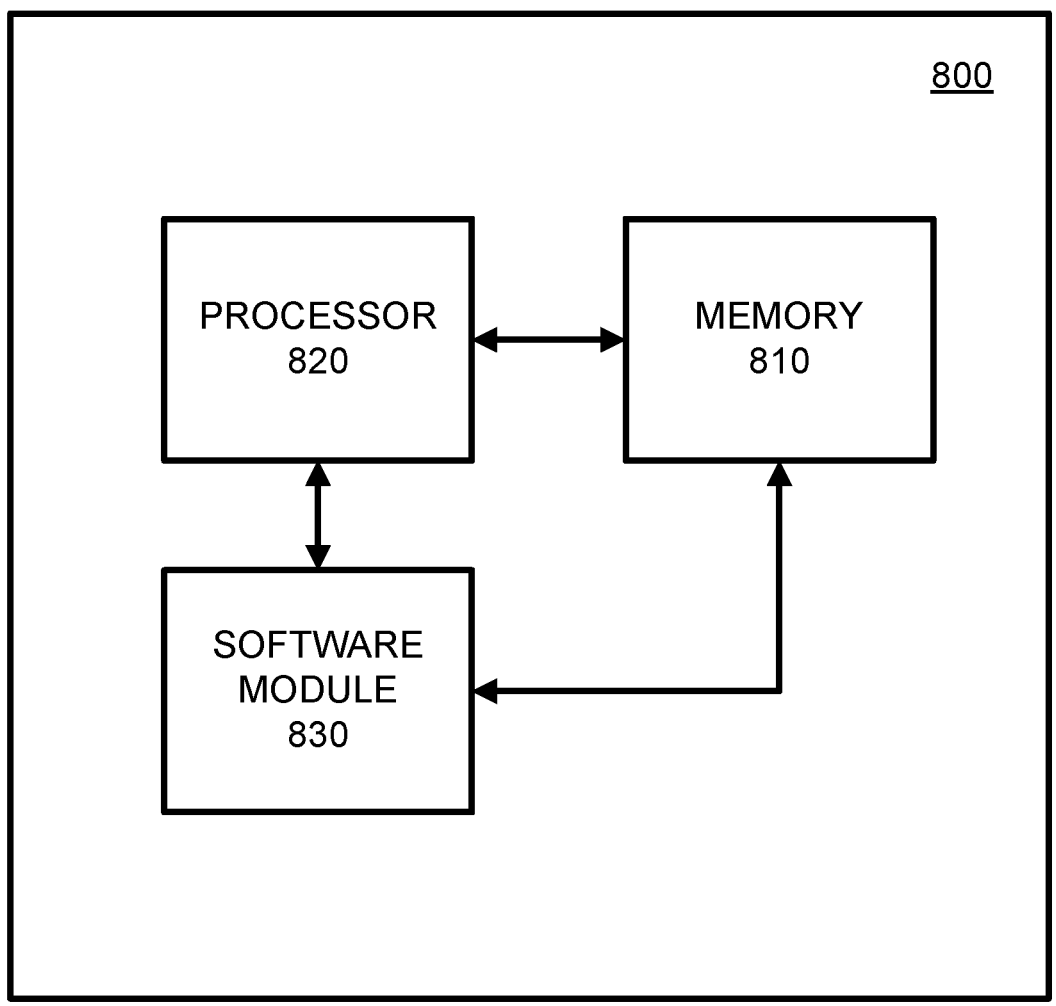
FIG. 8 illustrates an example network entity configured to support one or more of the example embodiments.

As illustrated in FIG. 8, a memory 810 and a processor 820 may be discrete components of a network entity 800 that are used to execute an application or set of operations as described herein. The application may be coded in software in a computer language understood by the processor 820, and stored in a computer readable medium, such as, a memory 810. The computer readable medium may be a non-transitory computer readable medium that includes tangible hardware components, such as memory, that can store software. Furthermore, a software module 830 may be another discrete entity that is part of the network entity 800, and which contains software instructions that may be executed by the processor 820 to effectuate one or more of the functions described herein. In addition to the above noted components of the network entity 800, the network entity 800 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   measuring, via one or more energy meter devices, energy metrics associated with network devices operating on a network, the network devices being configured to conduct and process blockchain transactions in a blockchain, and the network devices being configured to operate in accordance with corresponding energy contracts stored in the blockchain;
   identifying, by one or more of the network devices, one or more potential changes to an existing energy usage of the network based on the energy metrics;
   logging, by one or more of the network devices, the energy metrics and the one or more potential changes to the existing energy usage of the network in at least one energy measurement block of a distributed ledger of the blockchain; and
   calculating, via an energy optimizer block of the blockchain, and based on the energy metrics and the one or more potential changes to the existing energy usage of the network whether an energy contract of one or more of the network devices will be maintained or will be replaced with an optimized energy contract.

2. The method of claim 1, wherein the energy metrics comprise one or more of:
   energy consumption, energy bids, energy contracts, energy payments, and energy payment validation.

3. The method of claim 1, wherein the logging of the energy metrics as part of the distributed ledger comprises:
   creating an energy analytic forecast using supply and demand from historical contracts, the analytic forecast comprising one or more of energy bids, and energy use of the network devices.

4. The method of claim 1, further comprising:
   placing a bid for energy as one or more of the potential changes based on the energy metrics, by one or more of the network devices;
   receiving a contract based on the bid for energy, by one or more of the network devices; and
   updating a contract block of the distributed ledger to include the contract, by one or more of the network devices.

5. The method of claim 1, further comprising:
   measuring bidirectional energy usage on the network via at least one of the one or more energy meter devices;
   storing the bidirectional energy usage in the distributed ledger; and
   processing the bidirectional energy usage to create one or more of balance payments and energy credits as the one or more potential changes.

6. The method of claim 1, further comprising:
   calculating a supply and demand of energy from the energy metrics, by one or more of the network devices; and
   creating a suggested bid price based on the calculated supply and demand of energy, by one or more of the network devices.

7. A system, comprising:
   a plurality of network devices operating on the network, the network devices being configured to conduct and process blockchain transactions in a blockchain, and the plurality network devices being configured to operate in accordance with corresponding energy contracts stored in the blockchain; and
   one or more energy meter devices configured to measure energy metrics associated with the plurality of network devices, wherein the network devices configured to:
      identify one or more potential changes to an existing energy usage of the network based on the energy metrics,
      log the energy metrics and the one or more potential changes to the existing energy usage of the network in at least one energy measurement block of a distributed ledger of the blockchain, and
      calculate, via an energy optimizer block of the blockchain, and based on the energy metrics and the one or more potential changes to the existing energy usage of the network whether an energy contract of one or more of the network devices, of the plurality of network devices, will be maintained or will be replaced with an optimized energy contract.

8. The system of claim 7, wherein the energy metrics comprise one or more of:
energy consumption, energy bids, energy contracts, energy payments, and energy payment validation.

9. The system of claim 7, wherein the logging of the energy metrics in the distributed ledger comprises:
creating an energy analytic forecast using supply and demand from historical contracts, the analytic forecast comprising one or more of energy bids, and energy use of the network devices.

10. The system of claim 7, wherein the plurality of network devices are further configured to:
place a bid for energy as one or more of the potential changes based on the energy metrics;
receive a contract based on the bid for energy; and
update a contract block of the distributed ledger to include the contract.

11. The system of claim 7, wherein the one or more energy meter devices are configured to measure bidirectional energy usage on the network, the distributed ledger stores the bidirectional energy usage, and
the bidirectional energy usage is processed to create one or more of balance payments and energy credits as the one or more potential changes.

12. The system of claim 7, wherein the plurality of network devices are further configured to:
calculate a supply and demand of energy from the energy metrics; and
create a suggested bid price based on the calculated supply and demand of energy is created.

13. A non-transitory computer readable medium comprising one or more instructions that when executed by a processor cause the processor to perform:
receiving measured energy metrics associated with network devices operating on a blockchain network from one or more energy meter devices the network devices being configured to operate in accordance with corresponding energy contracts stored in the blockchain;
identifying one or more potential changes to an existing energy usage of the network based on the energy metrics;
logging the energy metrics and the one or more potential changes to the existing energy usage of the network in at least one energy measurement block of a distributed ledger of the blockchain; and
calculating, via an energy optimizer block of the blockchain, and based on the energy metrics and the one or more potential changes to the existing energy usage of the network whether an energy contract of one or more of the network devices will be maintained or will be replaced with an optimized energy contract storing the distributed ledger in the blockchain.

14. The non-transitory computer readable medium of claim 13, wherein the energy metrics comprise one or more of:
energy consumption, energy bids, energy contracts, energy payments, and energy payment validation.

15. The non-transitory computer readable medium of claim 13, wherein logging the energy metrics as part of the distributed ledger comprises:
creating an energy analytic forecast using supply and demand from historical contracts, the analytic forecast comprising one or more of energy bids, and energy use of the network devices.

16. The non-transitory computer readable medium of claim 13, further comprising one or more instructions that when executed by the processor cause the processor to perform:
placing a bid for energy as one or more of the potential changes based on the energy metrics;
receiving a contract based on the bid for energy; and
updating a contract block of the distributed ledger to include the contract.

17. The non-transitory computer readable medium of claim 13, further comprising one or more instructions that when executed by the processor cause the processor to perform:
receiving measured bidirectional energy usage on the network from at least one of the one or more energy meter devices;
storing the bidirectional energy usage in the distributed ledger; and
processing the bidirectional energy usage to create one or more of balance payments and energy credits as the one or more potential changes.

18. The non-transitory computer readable medium of claim 13, further comprising one or more instructions that when executed by the processor cause the processor to perform:
calculating a supply and demand of energy from the energy metrics; and
creating a suggested bid price based on the calculated supply and demand of energy, wherein
the blockchain block is stored in one or more of the network devices and at least one of the one or more energy meter devices.

* * * * *